United States Patent [19]

Schwarz

[11] 4,170,280

[45] Oct. 9, 1979

[54] BLEEDER HARNESS FOR BRAKE MASTER CYLINDERS

[75] Inventor: Maurice L. Schwarz, Middletown, Conn.

[73] Assignee: Parker-Hannifin Corporation, Cleveland, Ohio

[21] Appl. No.: 886,403

[22] Filed: Mar. 14, 1978

[51] Int. Cl.² ............................ B60T 11/30; F15B 7/10
[52] U.S. Cl. ........................................ 188/352; 60/584
[58] Field of Search ........................... 60/584; 141/94; 188/352; 222/399; 251/347

[56] References Cited

U.S. PATENT DOCUMENTS

| | | | |
|---|---|---|---|
| 2,670,874 | 3/1954 | Wilkerson | 188/352 X |
| 2,872,951 | 2/1959 | Wilkerson | 188/352 X |
| 2,892,614 | 6/1959 | Majneki | 188/352 X |
| 3,183,673 | 5/1965 | Schwarz | 188/352 X |

Primary Examiner—Duane A. Reger
Attorney, Agent, or Firm—McCormick, Paulding & Huber

[57] ABSTRACT

The invention resides in a harness adapted for connection with various master cylinders provided in automotive brake systems includes two body members connected together by a hose and adapted for thrust connection to a dual master cylinder at its two inlets to supply brake fluid under pressure to the master cylinder from a tank or other source. The thrust connection of each member is maintained by an adjustable elastic strap which extends around the master cylinder and has selected portions received and retained within open end key hole slots in opposite ends of a cross bar carried by the member for the purpose of bleeding air from such systems.

11 Claims, 5 Drawing Figures

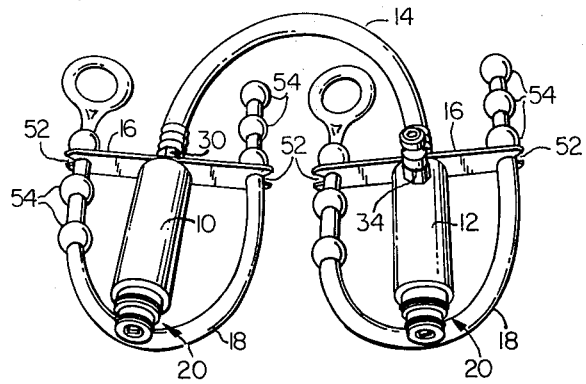
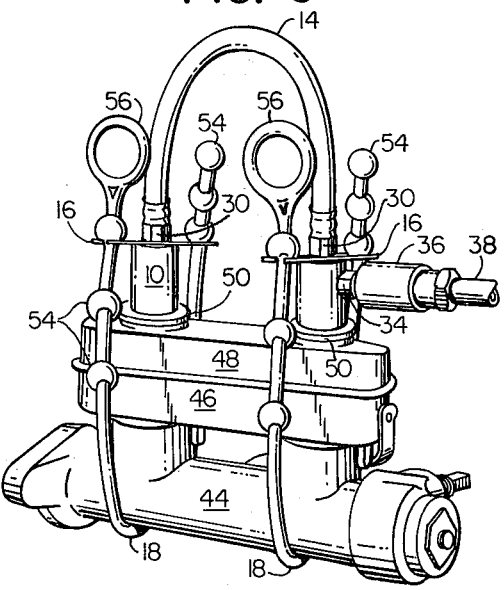
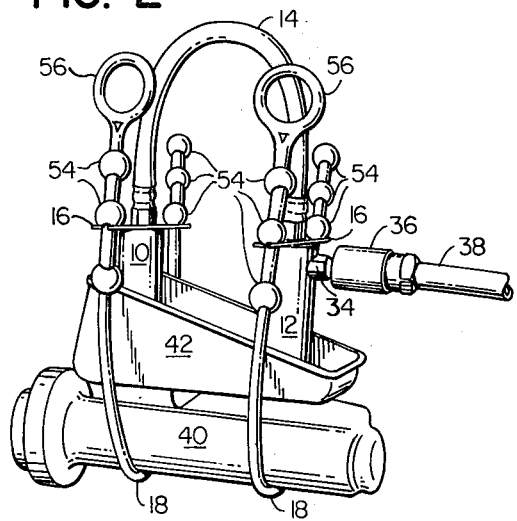
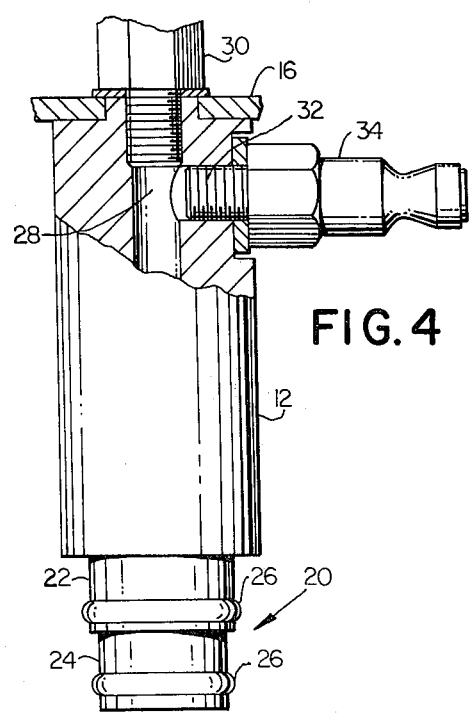
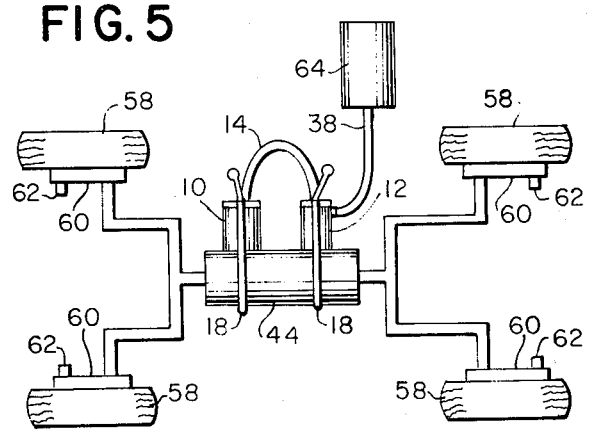

BLEEDER HARNESS FOR BRAKE MASTER CYLINDERS

BACKGROUND

The reliability, and thus the safety, of automotive hydraulic brake systems depends to a significant extent upon the capability to purge such systems of air. This purging or bleeding air from the systems involves filling a system from the driver-operated master cylinder to the brake-actuating wheel cylinders with hydraulic brake fluid to the exclusion of air. In a proper and professional bleeding operation, brake fluid is introduced under pressure (from a tank or other source) to the master cylinder to flood the system with fluid and thus to drive air from the system at vent valves located at the various wheel cylinders.

Modern automotive brake systems are "dual". That is, a master cylinder having a tank or reservoir is provided with two inlets connected to the reservoir. In normal operation, when the vehicle driver depresses the foot pedal to actuate the master cylinder fluid is forced through both of the dual systems to all four wheel cylinders to perform the braking operation. In the event of rupture or other failure in one of the dual systems, braking can still take place because the master cylinder will supply the remaining or sound system supplying two of the wheel cylinders.

Heretofore, in bleeding brake systems it has been the practice to remove the cover of the master cylinder reservoir, to then make certain that the reservoir is at least partially filled to provide a body of fluid over the master cylinder inlets, then to provide a substitute cover or plate over the reservoir having a tubular appendage whose lower end would be submerged in the fluid in the reservoir, and then to supply brake fluid from a source under pressure to such appendage and thus to the inlets for the dual brake systems.

Recent master cylinder design changes, for various reasons, have brought about non-uniformity in the configuration of the master cylinder reservoirs. As a result, the brake bleeding plate with its tubular extension for the reservoir cannot be depended upon for use in bleeding all brake systems.

Accordingly, and in meeting this problem, it is the general object of the present invention to provide a harness which is adaptable to most, and perhaps all, master cylinder reservoirs for introducing brake fluid under pressure in the system bleeding operation.

SUMMARY OF THE INVENTION

In keeping with the present invention, a harness is provided which includes a pair of body members, each of which is adapted for direct and thrust connection with a master cylinder inlet exposed to the reservoir of the master cylinder. These body members each have main passages for the introduction of hydraulic brake fluid to the inlets of the master cylinder, and the main passages of the two body members are connected together by a hose. At least one of the body members is provided with a passage connectible to a conventional source of hydraulic brake fluid under pressure to introduce the fluid to its main passage and thus through the hose to the main passage of the other body member and into both of the dual brake systems through the master cylinder inlets.

These body members are connected to the master cylinder by being thrust into the master cylinder inlets, and it is an important part of the present invention to provide fastening means for securing this thrust connection after it is made and during the bleeding operation. Such fastening means for each body member comprises a crossbar secured to the body member and having end portions which are particularly adapted to receive a securing strap which is passed around the master cylinder. In preferred form, the ends of the crossbar are adapted by providing open end key hole slots, and in preferred form the strap for each body member comprises an elastic band or thong having enlarged portions near each of its ends which will not pass through any portion of such key hole slot. Thus, when the band or thong is stretched, it can be thrust into the key hole through its open end opening and then relaxed, but the enlarged portion cannot be drawn through the key hole and will hold the crossbar and the body member, and thus the harness, secure in the thrust connection with the master cylinder.

BRIEF DESCRIPTION OF THE DRAWINGS

FIG. 1 is a perspective view of the harness provided by this invention, the harness being shown in a "stored" condition such as it would be in until applied for purpose of bleeding automotive brake systems.

FIG. 2 shows the harness depicted in FIG. 1 attached to one style or design master cylinder and master cylinder reservoir for the purpose of bleeding brake systems coupled to such master cylinder.

FIG. 3 is a view similar to FIG. 2, but showing the harness attached to another type master cylinder having a master cylinder reservoir of different design.

FIG. 4 is an enlarged view of one of the two body members forming a part of the harness shown in the other figures of the drawing.

FIG. 5 is a diagrammatic view illustrating an hydraulic brake system of a motor vehicle with a harness of the invention operatively connected thereto.

DESCRIPTION OF THE PREFERRED EMBODIMENT

The essential elements of the harness of this invention as shown in FIG. 1 comprise a pair of very similar body members 10 and 12, a hose 14 interconnecting such body elements and providing communication between their fluid passages, and fastening means which include a crossbar 16 and a strap 18 associated with each of the body members 10 and 12.

Referring now for more detail to the elements of the harness shown in FIG. 1, attention is directed to FIG. 4 showing the body member 12 which is very similar to the body element 10. Each body member is preferably cylindrical and has a downwardly extending cylindrical and tubular projection 20 for selective connection with master cylinders at the master cylinder inlets. Such extension or plug projection 20 has an upper portion 22 and a lower portion 24, the upper portion being of greater diameter than the lower portion. Each such portion carries an "O" ring seal 26 to provide a leak proof connection when the plug 20 is thrust into a master cylinder inlet. Obviously, the lower and smaller diameter portion 24 is adapted to fit the inlets in some master cylinders, while the plug section 22 is adapted to fit the larger inlet openings in other master cylinders.

The thrust plug extension 20 on each body member communicates with a main fluid passage 28 in the body member, and it will be observed that this main fluid passage is located on the axis of the body member and it is threaded at its upper end to receive a connector 30 connected to an end of the hose 14.

One of the body members, for example the body member 12, is provided with a second passage 32 opening into the main passage 28, and an element 34 of a quick disconnect connector is fixedly secured in the passage 32. The element 34 is provided for connection with a cooperating quick disconnect connector element 36 secured to the end of the hose 38 as shown in FIGS. 2 and 3. The hose 38 communicates with a tank or other source of brake fluid under pressure (not shown).

A conventional check or restrictor valve (not shown) is located in each main passage 28 at its lower extremity within the plug 20. Such valve is adapted to be opened and permit flow of brake fluid out of the main passage 28 and into a master cylinder when the harness is connected to a source of fluid under pressure by the hose 38. Then, when the hose is disconnected the valves in the main passages 28, 28 of the body members 10 and 12 close to retain brake fluid in both body members and in the interconnecting hose 14. If desired, a check valve can be employed in the connector element 34 to prevent leakage of brake fluid while the hose 38 is disconnected, but this is not essential. That is, atmospheric air pressure at the connector element 34 will serve to keep the hydraulic fluid in the harness, the said fluid not being under pressure with the hose 38 disconnected.

In FIG. 2 the harness is shown connected to one type master cylinder 40 having a reservoir 42 whose top is sloped. The cover for the reservoir 42 has been removed for the brake bleeding operation, and the body members 10 and 12 have been connected to the master cylinder 40 by having their plug elements 20, 20 thrust into the inlet openings to the master cylinder 40 from the reservoir 42.

In FIG. 3 the harness is shown connected for brake bleeding purposes to another type master cylinder 44 having a reservoir 46 which is closed by a cover 48 having normally capped filler openings 50, 50. In the bleeding operation, the caps are removed from the filler openings 50, 50 and the body members 10 and 12 are thrust therethrough and into the inlet openings to the associated master cylinder 44.

The harness is fastened to each type master cylinder in the same way and by use of the crossbar 16 and strap 18 associated with each body member. As best shown in FIGS. 1 and 4, the crossbars 16, 16 are connected to the body members 10 and 12 at the top thereof and are retained in place by the connectors 30, 30 at the ends of the hose 14. Each crossbar has a key hole slot at each of its ends for adjustable connection with the associated strap 18. Each such key hole slot has a circular opening spaced from the end of the crossbar and this circular opening communicates to a slot having a relatively narrow neck at the circular opening but which diverges through the end of the crossbar.

The preferred strap 18 is elastic and is of such diameter that when at rest it cannot be thrust through the end opening in the key hole slot 52 to the circular portion of the said slot. However, when the strap is stretched manually its diameter will be reduced so that it can be thrust into the circular opening through the end opening in the key hole slot. It will be observed that each strap has a plurality of enlarged portions 54, 54 which are spaced apart at each end portion of the strap and these enlarged portions are of such size that they cannot be drawn through the circular opening in the key hole slot 52. A finger loop 56 is formed on one end of each strap to enable the mechanic applying the harness to apply tension to the strap as it is passed around the body of the associated master cylinder. In this way, and as illustrated in FIGS. 2 and 3, the bleeding harness can be firmly secured to the associated master cylinder and to maintain the thrust connection between the body members of the harness and the master cylinder.

FIG. 5 diagrammatically illustrates a dual hydraulic braking system of a motor vehicle with the harness of the invention operatively connected thereto. The illustrated motor vehicle has four wheels 58, 58, each having an individual braking unit 60. The braking units 60, 60 are connected in pairs through the usual conduits to the dual master cylinder 44 in a conventional manner. Each braking unit 60 has a conventional bleed vent indicated at 62 which may be opened to vent air from an associated branch of the system. The harness which includes the body members 10 and 12 is attached to the master cylinder in the manner aforedescribed. The hose 38 is connected to a source of brake fluid under pressure, indicated at 64. When one of the bleed vents 62 is opened brake fluid and entrained air escapes from the vent. Fluid which escapes from the open vent is replaced by fluid fed to the master cylinder from the harness.

I claim:

1. A harness for connection to a master cylinder to bleed air from an hydraulic brake system coupling the master cylinder to at least one wheel cylinder, the master cylinder having a brake fluid reservoir and an inlet opening to the reservoir and the wheel cylinder having a vent for air, the said harness comprising a body member adapted for thrust connection to the master cylinder at said inlet and having brake fluid passages connectible with a source of such fluid under pressure for introduction to the system at the said master cylinder inlet, a crossbar connected to the said body, and a strap adapted for adjustable connection to the ends of the crossbar and to pass around the master cylinder to maintain the thrust connection of the body to the master cylinder at the said inlet.

2. The harness as set forth in claim 1 wherein the ends of the said crossbar are adapted to receive selected portions of the strap.

3. The harness of claim 1 wherein the ends of the crossbar have open end key hole slots adapted to receive and retain selected portions of the strap.

4. The harness construction of claim 3 wherein the strap is elastic and has spaced enlarged portions near each of its ends larger than any portion of the key hole slots.

5. A harness for connection to a master cylinder to bleed air from dual hydraulic brake systems wherein the master cylinder has a reservoir and two inlet openings to the reservoir, and the master cylinder is connected to at least one wheel cylinder through each of the dual systems, each such wheel cylinder being provided with a vent for air in the system to which it is connected, the said harness comprising two body members adapted for thrust connection to the master cylinder at its two said inlets, each body member having a main brake fluid passage communicating with the master cylinder at the inlet to which the body member is connected, a hose connecting said body members and their main fluid passages, one of said body members having fluid passage means for connecting its main fluid passage to a source of brake fluid under pressure and thereby to supply fluid to the dual systems at the master cylinder inlets, and fastening means for securing the two body members in the said thrust connection to the master cylinder.

6. The harness defined in claim 5 wherein each body member is adapted for thrust connection to any of a plurality of master cylinders having inlet openings of different size.

7. The harness of claim 5 wherein the fastening means for each body member comprises a crossbar connected to the body member, and a strap adapted for adjustable connection to the ends of the crossbar and to pass around the master cylinder.

8. The harness as set forth in claim 7 wherein the ends of the crossbar are adapted to receive selected portions of the strap.

9. The harness of claim 7 wherein the ends of the crossbar have open end key hole slots adapted to receive and retain selected portions of the strap.

10. The harness construction of claim 9 wherein the strap is elastic and has spaced enlarged portions near each of its ends larger than any portion of the key hole slots.

11. A harness for connection to a master cylinder to bleed air from dual hydraulic brake systems wherein the master cylinder has a reservoir and two inlet openings to the reservoir, and the master cylinder is connected to at least one wheel cylinder through each of the dual systems, each such wheel cylinder being provided with a vent for air in the system to which is is connected, the said harness comprising two body members adapted for thrust connection to the master cylinder at its two said inlets, each body member having a main brake fluid passage communicating with the master cylinder at the inlet to which the body member is connected, means for connecting said body members and their main fluid passages, means for supplying brake fluid under pressure to the main brake fluid passages and thereby to supply fluid to the dual systems at the master cylinder inlets, and fastening means for securing the harness to the master cylinder with the two body members in the said connection thereto.

* * * * *